US011281200B2

(12) United States Patent
Halgren, III et al.

(10) Patent No.: US 11,281,200 B2
(45) Date of Patent: Mar. 22, 2022

(54) DRONE-ENABLED OPERATOR ROUNDS

(71) Applicant: FISHER-ROSEMOUNT SYSTEMS, INC., Round Rock, TX (US)

(72) Inventors: Robert G. Halgren, III, Austin, TX (US); Claudio Fayad, Austin, TX (US); Gary K. Law, Georgetown, TX (US); Mark J. Nixon, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 260 days.

(21) Appl. No.: 16/580,793

(22) Filed: Sep. 24, 2019

(65) Prior Publication Data

US 2020/0103881 A1 Apr. 2, 2020

Related U.S. Application Data

(60) Provisional application No. 62/739,829, filed on Oct. 1, 2018.

(51) Int. Cl.
*G05B 19/00* (2006.01)
*G05B 19/418* (2006.01)
(Continued)

(52) U.S. Cl.
CPC ...... *G05B 19/41895* (2013.01); *B64C 39/024* (2013.01); *G05B 19/4183* (2013.01);
(Continued)

(58) Field of Classification Search
CPC .......... G05B 19/41895; G05B 19/4183; G05B 19/4186; G05D 1/0027; G05D 1/104;
(Continued)

(56) References Cited

U.S. PATENT DOCUMENTS 8,682,502 B2 * 3/2014 Jurmain ................ B25J 19/023
701/2
9,541,905 B2 1/2017 Nixon et al.
(Continued)

FOREIGN PATENT DOCUMENTS

JP      2019202682 A  * 11/2019
WO    WO-2018/115498 A1   6/2018
WO    WO-2019/177886 A1   9/2019

OTHER PUBLICATIONS

Search Report for Application No. GB1914021.9, dated Mar. 26, 2020.

*Primary Examiner* — Peter D Nolan
*Assistant Examiner* — Peter Y Ning
(74) *Attorney, Agent, or Firm* — Marshall, Gerstein & Borun LLP (57) ABSTRACT

Drones (e.g., unmanned aerial vehicles, or "UAVs") equipped with cameras and sensors may be configured to travel throughout the field environment of a process plant to monitor process plant conditions. Onboard computing devices associated with the drones control the movement of the drones through the field environment of the process plant. The onboard computing devices interface with the cameras and other sensors and communicate with user interface devices, controllers, servers and/or databases via a network. The onboard computing devices may receive drone commands from user interface devices and/or servers, or may access drone commands stored in one or more databases. The onboard computing devices may transmit data captured by the cameras and/or other sensors to UI devices, controllers, servers, etc. Accordingly, the user interface devices may display data (including live video feeds) captured by the drone cameras and/or drone sensors to an operator in a human machine interface application.

29 Claims, 4 Drawing Sheets

(51) Int. Cl.
  *G05D 1/00* (2006.01)
  *G05D 1/10* (2006.01)
  *B64C 39/02* (2006.01)
  *G08G 5/00* (2006.01)

(52) U.S. Cl.
  CPC ............ *G05D 1/0027* (2013.01); *G05D 1/104* (2013.01); *G08G 5/0034* (2013.01); *B64C 2201/126* (2013.01); *B64C 2201/127* (2013.01)

(58) Field of Classification Search
  CPC .... G05D 1/0044; G05D 1/0094; G05D 1/101; B64C 39/024; B64C 2201/126; B64C 2201/127; B64C 39/02; G08G 5/0034
  See application file for complete search history.

(56) References Cited

U.S. PATENT DOCUMENTS

| | | |
|---|---|---|
| 9,678,484 B2 | 6/2017 | Nixon et al. |
| 9,778,626 B2 | 10/2017 | Nixon et al. |
| 10,031,489 B2 | 7/2018 | Nixon et al. |
| 10,031,490 B2 | 7/2018 | Nixon et al. |
| 10,133,243 B2 | 11/2018 | Nixon et al. |
| 10,324,423 B2 | 6/2019 | Nixon et al. |
| 2008/0027591 A1 | 1/2008 | Lenser et al. |
| 2009/0095096 A1* | 4/2009 | Dean ........................ B25J 5/005 73/866 |
| 2010/0286859 A1 | 11/2010 | Feigh et al. |
| 2014/0277607 A1 | 9/2014 | Nixon et al. |
| 2014/0277615 A1 | 9/2014 | Nixon et al. |
| 2014/0277617 A1 | 9/2014 | Nixon et al. |
| 2014/0277618 A1 | 9/2014 | Nixon et al. |
| 2014/0282015 A1 | 9/2014 | Nixon et al. |
| 2015/0112469 A1* | 4/2015 | Da Silva Neto . G05B 19/41855 700/108 |
| 2016/0107749 A1* | 4/2016 | Mucci .................. G08B 29/185 701/3 |
| 2016/0132046 A1 | 5/2016 | Beoughter et al. |
| 2016/0282872 A1* | 9/2016 | Ahmed ................... G05D 1/106 |
| 2016/0282972 A1 | 9/2016 | Shu et al. |
| 2017/0337824 A1 | 11/2017 | Chen |
| 2018/0095032 A1* | 4/2018 | Alkadi ..................... G06F 16/29 |
| 2018/0109651 A1 | 4/2018 | Nixon et al. |
| 2018/0284758 A1* | 10/2018 | Celia ................... G05B 23/0229 |
| 2019/0256208 A1* | 8/2019 | Noto .................... G05D 1/0011 |
| 2019/0286110 A1* | 9/2019 | Alkhabbaz ............... G06F 8/65 |
| 2019/0369595 A1* | 12/2019 | Fievez .................. B64C 39/024 |
| 2020/0259896 A1* | 8/2020 | Sachs .................... H04W 12/03 |
| 2020/0307786 A1* | 10/2020 | Tavakolikhakaledi .... B64F 3/00 |
| 2020/0348662 A1* | 11/2020 | Cella ................... G05B 23/024 |
| 2020/0363822 A1* | 11/2020 | Georgeson ............ B64C 39/024 |

* cited by examiner

DRONE-ENABLED OPERATOR ROUNDS

FIELD OF THE DISCLOSURE

The present disclosure generally relates to industrial process plants and process control systems and, more particularly, to systems and methods of monitoring process plant conditions using drones.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices, controllers, and I/O devices are generally referred to as "process control devices," and are generally located, disposed, or installed in a field environment of a process control system or plant.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Although these viewing applications currently provide a great deal of information to operators via operator workstations located away from the field environment of the plant, operators must still venture out into the field environment of the plant to obtain some types of information. For example, although these viewing applications may display live or still images captured from cameras positioned within the plant, these cameras typically have fixed fields of view. Consequently, an operator may need to enter the field environment of the plant to investigate process plant events that fall outside of the fields of view of these cameras. Moreover, operators currently walk through the field environments of process plants during scheduled rounds, in which they inspect plant conditions, perform actions within the plant, etc., to complete plant safety checklists. However, because dangerous conditions, such as, e.g., hazardous chemicals, high temperatures, dangerous equipment, and/or loud noises, are prevalent in field environments of process plants, it is often unsafe for operators to physically enter the field environment of a process plant.

SUMMARY

A plurality of drones equipped with cameras and sensors may be configured to travel throughout the field environment of a process plant to monitor process plant conditions. Generally speaking, the drones are unmanned robotic vehicles. In some examples, the drones are aerial drones (e.g., unmanned aerial vehicles, or "UAVs"), while in other examples, the drones are ground-based or water-based drones, or drones with some combination of air-based, ground-based, and/or water-based features. Onboard computing devices associated with the drones control the movement of the drones through the field environment of the process plant. Additionally, the onboard computing devices interface with the cameras and other sensors and communicate with user interface devices, controllers, servers and/or databases via a network. For example, the onboard computing devices may receive drone commands from user interface devices and/or servers, or may access drone commands stored in one or more databases. Additionally, the onboard computing devices may transmit data captured by the cameras and/or other sensors to UI devices, controllers, servers, etc. Accordingly, the user interface devices may display data (including live video feeds) captured by the drone cameras and/or drone sensors to an operator in a human machine interface (HMI) application.

In one aspect, a method is provided. The method comprises: receiving, by a user interface device, an indication of a user selection of a piece of equipment in an overview of a process plant displayed by the user interface device where an unmanned robotic vehicle is to be deployed, the overview of the process plant depicting a representation of physical locations of various equipment within the process plant; transmitting, by the user interface device, the indication of the user selection to an onboard computing device associated with the unmanned robotic vehicle; determining, by the onboard computing device associated with the unmanned robotic vehicle, a destination location for the unmanned robotic vehicle in the process plant based on the indication of the user selection; controlling, by the onboard computing device associated with the unmanned robotic vehicle, the unmanned robotic vehicle to travel from a current location in the process plant to the destination location in the process plant; capturing camera data by one or more cameras of the unmanned robotic vehicle; transmitting, by the onboard computing device associated with the unmanned robotic vehicle, the camera data to the user interface device; and displaying, by the user interface device, the camera data alongside the overview of the process plant.

In another aspect, a user interface device is provided. The user interface comprises: a user interface device configured to communicate with an unmanned robotic vehicle equipped with one or more cameras, the user interface device comprising: a display; one or more processors; and one or more memories storing a set of computer-executable instructions. The computer-executable instructions, when executed by the one or more processors, cause the user interface device to: receive, from an onboard computing device of the unmanned robotic vehicle, data captured by the one or more cameras of the unmanned robotic vehicle; display an overview of a process plant alongside the data captured by the one or more cameras of the unmanned robotic vehicle, the overview of the process plant depicting a representation of physical locations of various equipment within the process plant; receive an operator selection of a piece of equipment within the overview of the process plant where the unmanned robotic vehicle is to be deployed; and transmit a command to the onboard computing device of the unmanned robotic vehicle indicating the selected piece of equipment within the overview of the process plant where the unmanned robotic vehicle is to be deployed.

In still another aspect, an unmanned robotic vehicle is provided. The unmanned robotic vehicle comprises: one or more cameras configured to capture images as the unmanned robotic vehicle travels in a process plant, one or more processors; and one or more memories storing a set of computer-executable instructions. The computer-executable instructions, when executed by the one or more processors, cause the unmanned robotic vehicle to: receive commands from a user interface device, wherein commands from the user interface device include commands indicating a piece of equipment in the process plant to which the unmanned robotic vehicle is to be deployed; determine a destination location in the process plant based on the indication of the piece of equipment in the process plant; travel from a current location in the process plant to the destination location in the process plant; and transmit images captured by the one or more cameras to the user interface device.

DETAILED DESCRIPTION

As described above, although viewing applications currently provide a great deal of information to operators via operator workstations located away from the field environment of the plant, operators must still venture out into the field environment of the plant to obtain some types of information. For example, although these viewing applications may display live or still images captured from cameras positioned within the plant, these cameras typically have fixed fields of view. Consequently, an operator may need to enter the field environment of the plant to investigate process plant events that fall outside of the fields of view of these cameras. Moreover, operators currently walk through the field environments of process plants during scheduled rounds, in which they inspect plant conditions, perform actions within the plant, etc., to complete plant safety checklists. However, because dangerous conditions, such as, e.g., hazardous chemicals, high temperatures, dangerous equipment, and/or loud noises, are prevalent in field environments of process plants, it is often unsafe for operators to physically enter the field environment of a process plant.

The systems, methods, devices, and techniques disclosed herein address these and other shortcomings of known systems by enabling operators to monitor conditions in process plants without physically entering the dangerous field environments of these plants. Specifically, systems, methods, devices, and techniques for monitoring process plant conditions using drones are disclosed herein. Advantageously, drones equipped with cameras and other sensors can safely monitor areas of a process plant that are too dangerous for operators to enter. For example, data captured by the cameras and other sensors may be transmitted to user interface devices and displayed to operators situated safely outside of the field environment.

Figure 1:
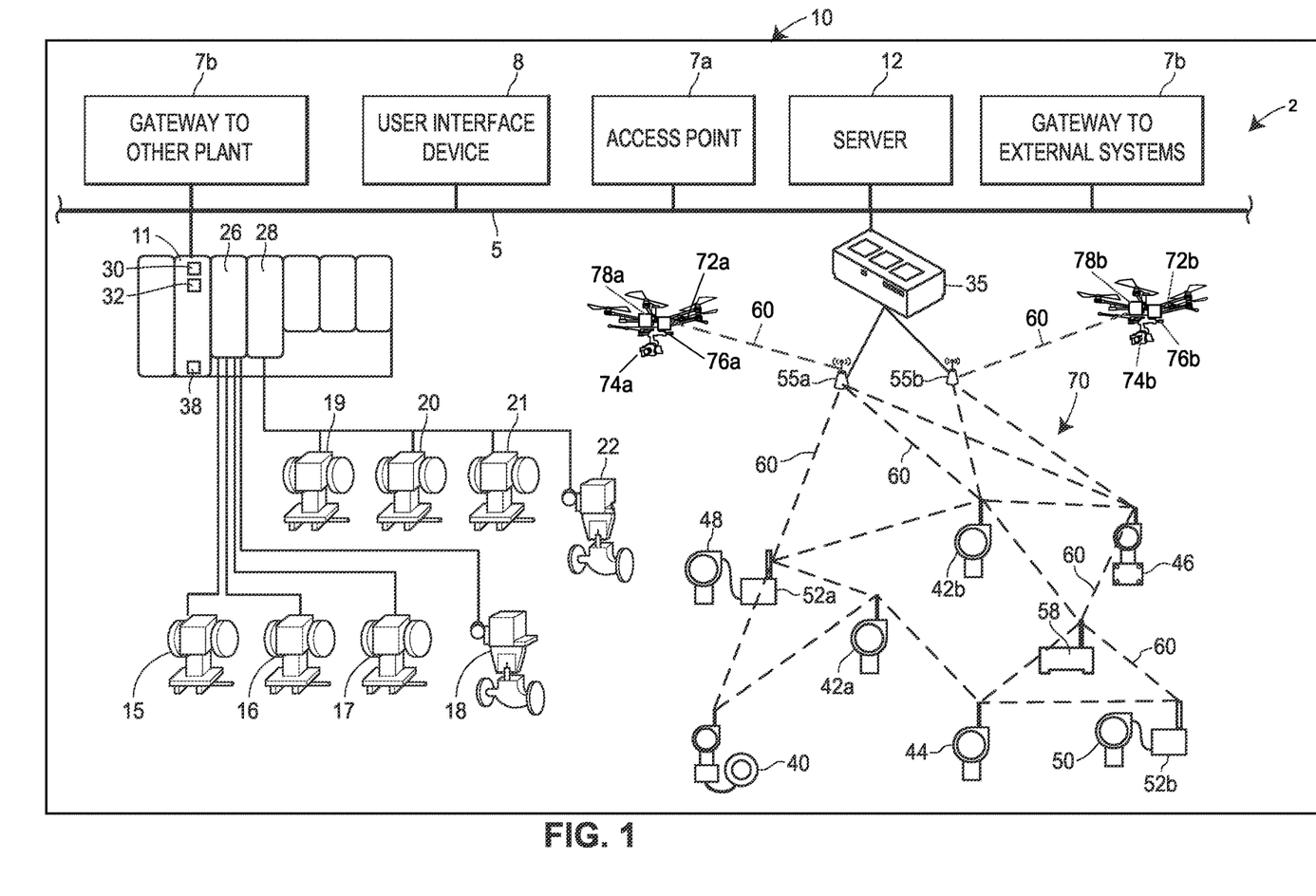
FIG. 1 depicts a block diagram illustrating an example process plant in which drones may be implemented and/or included to monitor process plant conditions.

FIG. 1 depicts a block diagram of an exemplary process control network or system 2 operating in a process control system or process plant 10 with and/or in which embodiments of the systems, methods, devices, and techniques for monitoring process plant conditions using drones described herein may be utilized. The process control network or system 2 may include a network backbone 5 providing connectivity directly or indirectly between a variety of other devices. The devices coupled to the network backbone 5 include, in various embodiments, combinations of one or more access points 7a, one or more gateways 7b to other process plants (e.g., via an intranet or corporate wide area network), or to external systems (e.g., to the Internet), one or more user interface (UI) devices 8 which may be stationary (e.g., a traditional operator workstation) or mobile computing devices (e.g., a mobile device smart-phone), one or more servers 12 (e.g., which may be implemented as a bank of servers, as a cloud computing system, or another suitable configuration), controllers 11, input/output (I/O) cards 26 and 28, wired field devices 15-22, wireless gateways 35, and wireless communication networks 70. The communication networks 70 may include wireless devices, which include wireless field devices 40-46, wireless adapters 52a and 52b, access points 55a and 55b, and a router 58. The wireless adapters 52a and 52b may be connected to non-wireless field devices 48 and 50, respectively. The controller 11 may include a processor 30, a memory 32, and one or more control routines 38. Though FIG. 1 depicts only a single one of some of the devices that are directly and/or communicatively connected to the network backbone 5, it will be understood that each of the devices could have multiple instances on the network backbone 5 and, in fact, that the process plant 10 may include multiple network backbones 5.

The UI devices 8 may be communicatively connected to the controller 11 and the wireless gateway 35 via the network backbone 5. The controller 11 may be communicatively connected to wired field devices 15-22 via input/output (I/O) cards 26 and 28 and may be communicatively connected to wireless field devices 40-46 via the network backbone 5 and a wireless gateway 35. The controller 11 may operate to implement a batch process or a continuous process using at least some of the field devices 15-22 and 40-50. The controller 11, which may be, by way of example, the DeltaV™ controller sold by Emerson, is communicatively connected to the process control network backbone 5. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1, the controller 11, the field devices 15-22, 48, 50 and the I/O cards 26, 28 are wired devices, and the field devices 40-46 are wireless field devices.

In operation of the UI device 8, the UI device 8 may, in some embodiments, execute a user interface ("UI"), allowing the UI device 8 to accept input via an input interface and provide output at a display. The UI device 8 may receive data (e.g., process related data such as process parameters, log data, and/or any other data that may be captured and stored), from the server 12. In other embodiments, the UI may be executed, in whole or in part, at the server 12, where the server 12 may transmit display data to the UI device 8. The UI device 8 may receive UI data (which may include display data and process parameter data) via the backbone 5 from other nodes in the process control network or system 2, such as the controller 11, the wireless gateway 35, and/or the server 12. Based on the UI data received at the UI device 8, the UI device 8 provides output (i.e., visual representations or graphics, some of which may be updated during run-time) representing aspects of the process associated with the process control network or system 2. The user may also affect control of the process by providing input at the UI device 8. To illustrate, the UI device 8 may provide graphics representing, for example, a tank filling process. In such a scenario, the user may read a tank level measurement and decide that the tank needs to be filled. The user may interact with an inlet valve graphic displayed at the UI device 8 and input a command causing the inlet valve to open.

In certain embodiments, the UI device 8 may implement any type of client, such as a thin client, web client, or thick client. For example, the UI device 8 may depend on other nodes, computers, UI devices, or servers for the bulk of the processing necessary for operation of the UI device 8, as might be the case if the UI device is limited in memory, battery power, etc. (e.g., in a wearable device). In such an example, the UI device 8 may communicate with the server 12 or with another UI device, where the server 12 or other UI device may communicate with one or more other nodes (e.g., servers) on the process control network or system 2 and may determine the display data and/or process data to transmit to the UI device 8. Furthermore, the UI device 8 may pass any data related to received user input to the server 12 so that the server 12 may process the data related to user input and operate accordingly. In other words, the UI device 8 may do little more than render graphics and act as a portal to one or more nodes or servers that store the data and execute the routines necessary for operation of the UI device 8. A thin client UI device offers the advantage of minimal hardware requirements for the UI device 8.

In other embodiments, the UI device 8 may be a web client. In such an embodiment, a user of the UI device 8 may interact with the process control system via a browser at the UI device 8. The browser enables the user to access data and resources at another node or server 12 (such as the server 12) via the backbone 5. For example, the browser may receive UI data, such as display data or process parameter data, from the server 12, allowing the browser to depict graphics for controlling and/or monitoring some or all of the process. The browser may also receive user input (such as a mouse click on a graphic). The user input may cause the browser to retrieve or access an information resource stored on the server 12. For example, the mouse click may cause the browser to retrieve (from the server 12) and display information pertaining to the clicked graphic. In yet other embodiments, the bulk of the processing for the UI device 8 may take place at the UI device 8. For example, the UI device 8 may execute the previously discussed UI. The UI device 8 may also store, access, and analyze data locally.

In operation, a user may interact with the UI device 8 to monitor or control one or more devices in the process control network or system 2, such as any of the field devices 15-22 or the devices 40-50. Additionally, the user may interact with the UI device 8, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-50 and with other nodes that are communicatively connected to the backbone 5. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be defined and implemented by a user through the UI device 8. The control routines may be stored in any desired type of memory, such as random access memory (RAM), or read only memory (ROM) of the controller 11. Likewise, the control routines may be hard-coded into, for example, one or more EPROMs, EEPROMs, application specific integrated circuits (ASICs), or any other hardware or firmware elements of the controller 11. Thus, the controller 11 may be configured (by a user using a UI device 8 in certain embodiments) to implement (e.g., receive, store, and/or execute) a control strategy or control routine in any desired manner.

In some embodiments of the UI device 8, a user may interact with the UI device 8 to define and implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 8, allowing a user to easily modify the types of function blocks, the connections between the function blocks, and the inputs/outputs associated with each of function blocks implemented in the process control system. Function blocks may be downloaded to, stored in, and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1, the wireless field devices 40-46 communicate in a wireless network 70 using a wireless protocol, such as the Wireless HART protocol. In certain embodiments, the UI device 8 may be capable of communicating with the wireless field devices 40-46 using the wireless network 70. Such wireless field devices 40-46 may directly communicate with one or more other nodes of the process control network or system 2 that are also configured to communicate wirelessly (using the wireless protocol, for example). To communicate with one or more other nodes that are not configured to communicate wirelessly, the wireless field devices 40-46 may utilize a wireless gateway 35 connected to the backbone 5. Of course, the field devices 15-22 and 40-46 could conform to any other desired standard(s) or protocols, such as any wired or wireless protocols, including any standards or protocols developed in the future.

The wireless gateway 35 may provide access to various wireless devices or nodes 40-46, 52-58 of a wireless communication network 70. In particular, the wireless gateway 35 provides communicative coupling between the wireless devices 40-46, 52-58 and other nodes of the process control network or system 2 (including the controller 11 of FIG. 1). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks, in an example implementation. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices 48, 50, which may be wired devices. For example, a field device 48 of FIG. 1 may be a legacy 4-20 mA device and a field device 50 may be a traditional wired HART device. To communicate within the network 70, the field devices 48 and 50 may be connected to the wireless communication network 70 via a respective wireless adaptor (WA) 52*a*, 52*b*. Additionally, the wireless adaptors 52*a*, 52*b* may support other communication protocols such as Foundation® Fieldbus, PROFIBUS, DeviceNet, etc. Furthermore, the wireless network 70 may include one or more network access points 55*a*, 55*b*, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 40-46 and 52-58 may communicate with each other and with the wireless gateway 35 over wireless links 60 of the wireless communication network 70.

In certain embodiments, the process control network or system 2 may include other nodes connected to the network backbone 5 that communicate using other wireless protocols. For example, the process control network or system 2 may include one or more wireless access points 7a that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, and/or other wireless communication protocols. Typically, such wireless access points 7a allow handheld or other portable computing devices to communicate over a respective wireless network that is different from the wireless network 70 and that supports a different wireless protocol than the wireless network 70. In some embodiments, the UI device 8 communicates over the process control network or system 2 using a wireless access point 7a. In some scenarios, in addition to portable computing devices, one or more process control devices (e.g., controller 11, field devices 15-22, wireless devices 35, 40-46, 52-58) may also communicate using the wireless network supported by the access points 7a.

Additionally or alternatively, the process control network or system 2 may include one or more gateways 7b to systems that are external to the immediate process control system. In such embodiments, the UI device 8 may be used to control, monitor, or otherwise communicate with said external systems. Typically, such systems are customers and/or suppliers of information generated or operated on by the process control system. For example, a plant gateway node 7b may communicatively connect the immediate process plant 10 (having its own respective process control data network backbone 5) with another process plant having its own respective network backbone. In an embodiment, a single network backbone 5 may service multiple process plants or process control environments.

In another example, the plant gateway node 7b may communicatively connect the immediate process plant to a legacy or prior art process plant that does not include a process control network or system 2 or backbone 5. In this example, the plant gateway node 7b may convert or translate messages between a protocol utilized by the process control big data backbone 5 of the plant 10 and a different protocol utilized by the legacy system (e.g., Ethernet, Profibus, Fieldbus, DeviceNet, etc.). In such an example, the UI device 8 may be used to control, monitor, or otherwise communicate with systems or networks in said legacy or prior art process plant.

The process control network or system 2 may include one or more external system gateway nodes 7b to communicatively connect the process control network or system 2 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, and/or other external systems. The external system gateway nodes 7b may, for example, facilitate communication between the process control system and personnel outside of the process plant (e.g., personnel at home).

Although FIG. 1 illustrates a single controller 11 with a finite number of field devices 15-22, 40-46, and 48-50 communicatively connected thereto, this is only an illustrative and a non-limiting embodiment. Any number of controllers 11 may be included in the process control network or system 2, and any of the controllers 11 may communicate with any number of wired or wireless field devices 15-22, 40-50 to control a process in the plant 10. Furthermore, the process plant 10 may also include any number of wireless gateways 35, routers 58, access points 55, wireless process control communication networks 70, access points 7a, and/or gateways 7b.

In one example configuration of the process plant 10, a plurality of drones 72a, 72b equipped with respective cameras 74a, 74b and/or other sensors 76a, 76b travel throughout the field environment of the process plant 10 to monitor process plant conditions. Generally speaking, the drones 72a, 72b are unmanned robotic vehicles. In some examples, the drones 72a, 72b are aerial drones (e.g., unmanned aerial vehicles, or "UAVs"), while in other examples, the drones 72a, 72b are ground-based or water-based drones, or drones with some combination of air-based, ground-based, and/or water-based features. Onboard computing devices 78a, 78b associated with the drones 72a, 72b control the movement of the drones 72a, 72b through the field environment of the process plant 10. Additionally, the onboard computing devices 78a, 78b interface with the cameras 74a, 74b and/or other sensors 76a, 76b and communicate with the user interface device 8, controllers 11, server 12 and/or one or more databases, e.g., via the network 70. For example, the onboard computing devices 78a, 78b may receive drone commands from the user interface device 8 and/or server 12, or may access drone commands stored in one or more databases. As another example, the onboard computing devices 78a, 78b may transmit data captured by the cameras 74a, 74b and/or other sensors 76a, 76b to the UI device 8, the controllers 11, the server 12, and/or any other suitable computing device. Accordingly, the user interface device 8 displays data captured by the cameras 74a, 74b and/or other sensors 76a, 76b to an operator.

Figure 2:
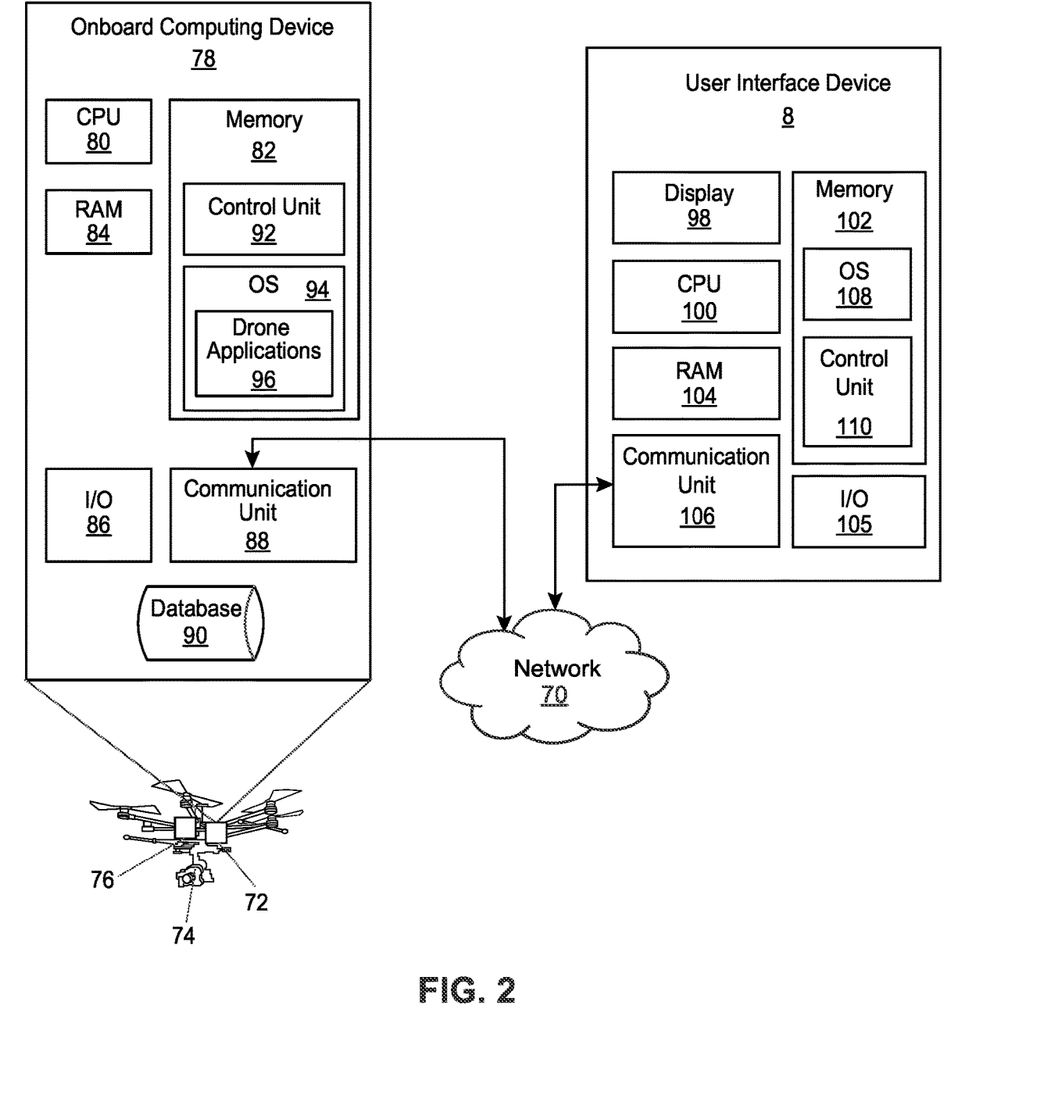
FIG. 2 is a block diagram of an example drone onboard computing device and an example user interface device schematically illustrated in FIG. 1.

FIG. 2 illustrates a block diagram of an example onboard computing device 78 (e.g., onboard computing devices 78a or 78b) associated with an example drone 72 (e.g., drones 72a or 72b) and an example UI device 8, which may be utilized in conjunction with embodiments of the system for monitoring process plant conditions using drones described herein. As shown in FIG. 2, the example drone 72 is equipped with one or more cameras 74 (which may include infrared cameras), one or more other sensors 76, and the onboard computing device 78. The cameras 74, sensors 76, and onboard computing device 78 may be attached to, contained within, carried by, or otherwise associated with the drone 72. The sensors 76 may include, for instance, location sensors, temperature sensors, flame sensors, gas sensors, wind sensors, accelerometers, motion sensors, and/or other suitable sensors. In some examples, the drone 72 is further equipped with additional accessories such as, e.g., lights, speakers, microphones, etc. Additionally, in some examples, apparatus for collecting samples, medical kits, breathing apparatus, defibrillator units, etc. are attached to, contained within, carried by, or otherwise associated with the drone 72. Moreover, the drone 72 may be equipped with additional mechanical components for performing various actions within the plant 10. For example, the drone 72 may be equipped with a robotic arm for activating switches or collecting samples.

The onboard computing device 78 interfaces with the camera 74, sensors 76, and/or additional mechanical components, and executes applications to receive drone path commands, control the path of the drone 72, and store and transmit data captured by the drone camera 74 and/or drone sensors 76. The onboard computing device 78 generally includes one or more processors or CPUs 80, a memory 82, a random-access memory (RAM) 84, an input/output (I/O) circuit 86, and a communication unit 88 to transmit and receive data via a local area network, wide area network, and/or any other suitable network, which may be wired and/or wireless (e.g., network 70.) For example, the onboard computing device 78 may communicate with the UI device 8, the controllers 11, the server 12, and/or any other suitable computing device.

Additionally, the onboard computing device 78 includes a database 90 storing data associated with the drone 72. For example, the database 90 may store data captured by the drone camera 74 and/or drone sensors 76. Additionally, the database 90 may store navigation data, such as, for instance, a map of the plant 10. The map may include one or more paths for the drone 72 to travel throughout the plant 10, as well as indications of the locations of various equipment within the plant 10. The indications of the locations of the various plant equipment may include indications of locations of various vantage points near each piece of equipment. Additionally, the indications of the locations of the various plant equipment may include indications of locations of one or more drone-activated switches (e.g., kill switches).

The memory 82 further includes a control unit 92 and an operating system 94 including one or more drone applications 96. The control unit 94 is configured to communicate with the UI device 8, the controllers 11, the server 12, and/or any other suitable computing device. For example, in some embodiments, the control unit 94 may communicate the data captured by the drone camera 74 and/or the drone sensors 76 to the UI device 8, the controllers 11, the server 12, and/or any other suitable computing device. Moreover, the control unit 94 is configured to control the movement and actions of the drone 72 in the plant.

Generally speaking, the drone applications 96 running on the operating system 94 may include applications providing instructions to the control unit 94 for controlling the movement and actions of the drone 72 within the plant. Additionally, the drone applications 96 may include applications for analyzing data captured by the camera 74 and/or sensors 76, and for transmitting/receiving data from the UI device 8, the controllers 11, the server 12, and/or any other suitable computing device.

For example, drone applications 96 providing instructions to the control unit 94 for controlling the movement and actions of the drone 72 within the plant may include a drone navigation application. Generally speaking, the drone navigation application utilizes some combination of navigation data stored in the database 90 and location data captured by the sensors 76 to determine the current location of a drone 72 within the plant 10. When a destination for the drone 72 is received or determined, the drone navigation application may calculate a route from the current location to the destination location.

In some examples, destination locations for the drone 72 may be preconfigured and stored in the database 90. For instance, the database 90 may store a route or path that the drone 72 is to repeatedly travel, or may store a specific location where the drone 72 is to hover (e.g., proximate to certain equipment within the plant). Additionally, the database 90 may store a list of routes or destinations where the drone is to travel based on various triggers or conditions within the plant 10. For instance, the database 90 may store data indicating that the drone 72 is to travel to a certain location or travel a certain route within the plant 10 based on an alarm within the plant 10 or a plant condition. For example, the database 90 may store an indication of a safe location for the drone 72 to travel to, or a safe route for the drone 72 to travel out of the plant 10 in the event of a fire, toxic gas leak, spill, explosion, etc. For example, individuals within the plant 10 may follow the drone 72 out of the plant during these dangerous conditions. In other instances, the database 90 may store an indication of a location or route close to the fire, toxic gas leak, spill, explosion, etc., (e.g., in order to capture photos, videos, or other data associated with the alarm or other condition, in order to create a drone "fence" securing a perimeter of an unsafe condition, or in order to lead emergency assistance towards the plant condition). Furthermore, the database 90 may store data indicating that the drone 72 is to travel to a certain location or travel a certain route based on the capture of triggering sensor data (e.g., sensor data indicative of a plant condition).

In other examples, destination locations for the drone 72 may be selected by a navigation application based on commands (e.g., operator commands) received from the UI device 8, the controllers 11, the server 12, and/or any other suitable computing device. For example, an operator may select an area of the plant 10 or a piece of equipment in the plant 10 via the UI device 8, and the destination may be selected based on a location stored in the database 90 for the area of the plant 10 or piece of equipment. Additionally, an operator may select an individual within the plant 10 via the UI device 8, and the destination may be selected based on a location associated with the individual (e.g., based on GPS data associated with the individual, or based on a location associated with the individual stored in the database 90). As another example, an operator may utilize directional controls (e.g., left, right, up, down, forward, backwards, etc.), and a destination may be selected by the navigation application based on a directional movement from the current location of the drone 72.

Furthermore, drone applications 96 providing instructions to the control unit 94 for controlling the actions of the drone 72 within the plant may include applications providing instructions to the control unit for causing the drone to activate a switch (e.g., a kill switch to shut down equipment in unsafe locations, such as drilling sites), take a measurement, perform an assessment, collect a sample, project a warning (via an accessory speaker system), listen for voice commands (via an accessory microphone), pick up an object (e.g., a tool, a medical kit, etc.) and take it to a new location within the plant (e.g., a location near an individual), switch objects as needed for various situations, assist individuals within the plant as needed (e.g., as a "handyman"), etc. As with the navigation destinations, in some examples, actions for the drone 72 to perform may be preconfigured and stored in the database 90, while in other examples, actions for the drone 72 to perform may be selected based on commands (e.g., operator commands) received from the UI device 8, the controllers 11, the server 12, and/or any other suitable computing device.

Additionally, drone applications 96 for analyzing data captured by the camera 74 and/or sensors 76 may include an image recognition application for analyzing photos or videos from the camera 74, or a sensor analysis application configured to analyze data from the drone sensors 76, or some combination of the two, for automatically identifying indications of various conditions within the process plant, such as, e.g., overheating, fire, smoke, movement, leaks (including identifying the size of a leak), drips, puddles, steam, or valve conditions (including identifying whether a valve is open or closed). Moreover, the applications running on the operating system 90 may include a sensor analysis application for determining, based on data from the drone sensors 76, prevailing wind speed and direction (e.g., to aid in assessing toxic gas leak impact). The drone applications 96 for analyzing data captured by the camera 74 and/or sensors 76 may further include a surveillance application. For example, the surveillance application may analyze facial features of individuals within the plant to identify unauthorized individuals within the plant. As another example, the surveillance application may analyze data captured by motion sensors to determine whether unauthorized individuals are moving through the plant. Additionally, the surveillance application may analyze photos or videos captured by the drone camera 74 to identify indications of unauthorized entry into the process plant, such as, for instance, damaged fences or broken doors.

Additionally or alternatively, the drone applications 96 may include an application causing the drone 72 to interact with other drones within the plant to create a field mesh and/or a wireless backhaul, in order to enable communications in a location without communication systems in place, or in a location that has temporarily lost communication functionality. Additionally, the applications running on the operating system 90 may include a GPS application causing a drone 72 to either transmit GPS information to other drones, or receive GPS information from a master drone in order to create a local temporary GPS system.

Turning back to the UI device 8, this device 8 may be a desktop computer such as a traditional operator workstation, a control room display, or a mobile computing device such as a laptop computer, a tablet computer, a mobile device smart-phone, a personal digital assistant (PDA), a wearable computing device, or any other suitable client computing device. The UI device 8 may execute a graphical display configuration application utilized by a configuration engineer in the configuration environment to create, generate, and/or edit various display view definitions or configurations as well as create, generate, and/or edit various display view element definitions or configurations. The UI device 8 may also execute an operator application utilized by an operator to monitor, observe, and react to various statuses and conditions of the process within the operating environment. The UI device 8 may include a display 98. Further, the UI device 8 includes one or more processors or CPUs 100, a memory 102, a random-access memory (RAM) 104, an input/output (I/O) circuit 105, and a communication unit 106 to transmit and receive data via a local area network, wide area network, and/or any other suitable network, which may be wired and/or wireless (e.g., network 70). The UI device 8 may communicate with the controllers 11, the server 12, the drone onboard computing device 78, and/or any other suitable computing device.

The memory 102 may include an operating system 108, applications running on the operating system 108 such as the graphical display configuration application and operator application, and a control unit 110 for controlling the display 98 and communicating with the controllers 11 to control on-line operation of the process plant. In some embodiments, the server 12 may transmit a graphical representation of a portion of the process plant to the UI device 8 and in turn, the control unit 110 may cause the graphical representation of the portion of the process plant to be presented on the display 98. Additionally, the control unit 110 may obtain user input from the I/O circuit 105, such as user input from the operator or configuration engineer (also referred to herein as a user) and translate the user input into a request to present a graphical display view in a particular language, a request to include graphics that are indicative of particular control elements in an Active Monitor or Watch window included on the display view, a request to display an adjustment to a process parameter included in one of the process sections, etc.

In some embodiments, the control unit 110 may communicate the translated user input to the server 12 which may generate and transmit the requested UI to the UI device 8 for display. In other embodiments, the control unit 110 may generate the new UI based on the translated user input and present the new UI on the display 98 of the UI device 8. When the translated user input is a request to display an adjustment to a process parameter included in one of the process sections, the control unit 110 may adjust the process parameter value on the display 98 in accordance with the user input from the operator and may provide instructions to the controllers 11 to adjust the process parameter in the process plant. In other embodiments, the control unit 110 may communicate the translated user input to the server 12 which may generate and transmit the adjusted process parameter value to the UI device 8 for display, and provide instructions to the controllers 11 to adjust the process parameter in the process plant.

Figure 3:
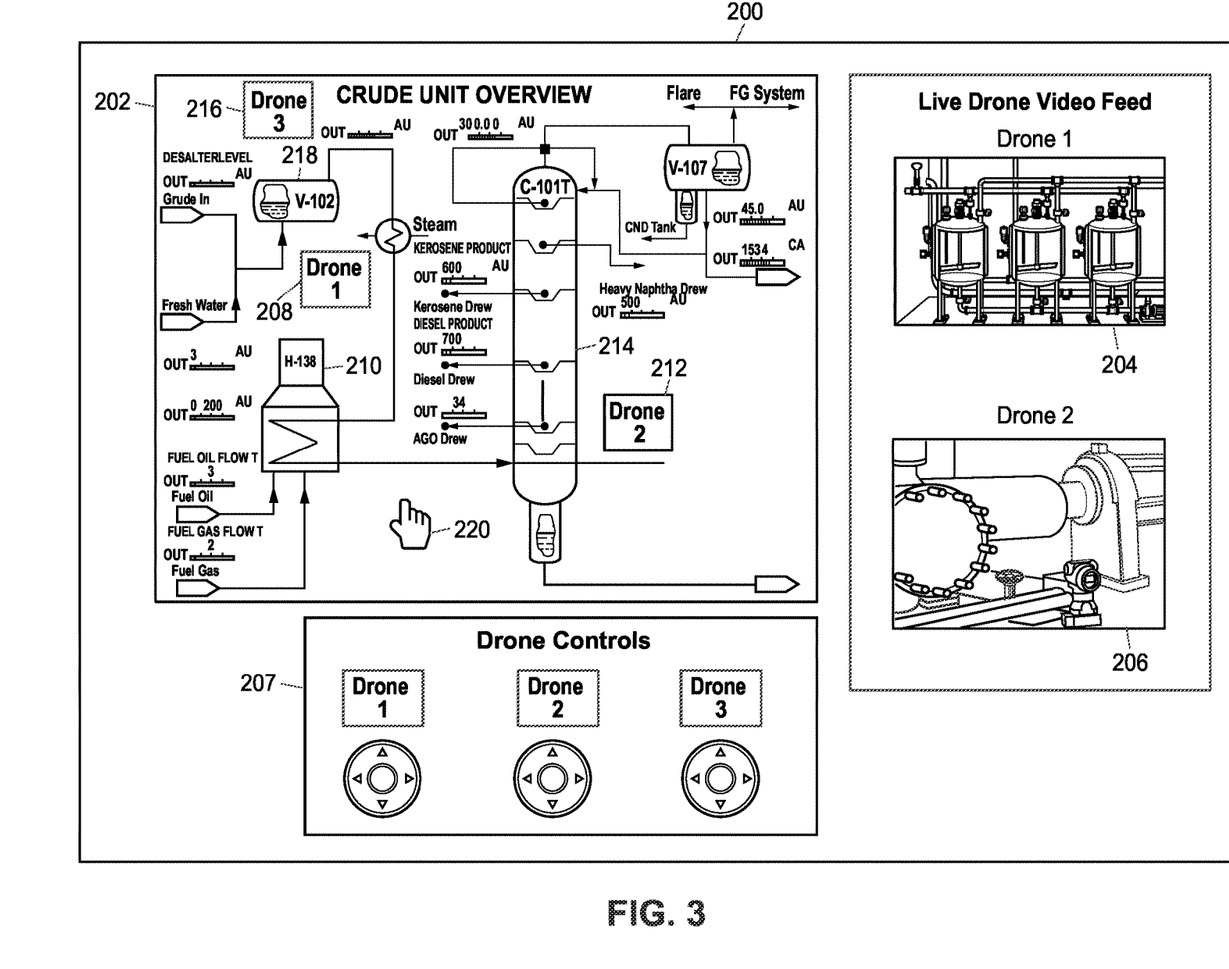
FIG. 3 is an example user interface display view of an operator application for monitoring process plant conditions using drones.

Turning now to FIG. 3, an example user interface display view 200 of an operator application for monitoring process plant conditions using drones (such as drones 72, 72a, 72b) is depicted, in accordance with an embodiment. The exemplary user interface display view 200 shown in FIG. 3 is displayed via the display 92 of the user interface 8. The user interface display view 200 includes an overview 202 of the process plant that is displayed alongside live video feeds 204, 206 associated with a first and second drone and a set of drone controls 207. Although two drone video feeds are displayed in FIG. 3, live video feeds associated with additional or fewer drones may be displayed in various embodiments. Moreover, in some embodiments, the user interface display view 200 includes a display associated with sensor data captured by sensors associated with drones within the process plant.

Generally speaking, the overview 202 of the process plant depicts a representation of the physical locations of various equipment within the plant, as well as a representation of the physical locations of various drones within the process plant with respect to the equipment. For example, drone 1 (208) is depicted near equipment 210. As another example, drone 2 (212) is depicted near equipment 214, and drone 3 (216) is depicted near equipment 218. Accordingly, the live video feed 204 associated with drone 1 depicts a live feed of a video showing the current status of equipment 210. Similarly, the live video feed 206 associated with drone 2 depicts a live feed of a video showing the current status of equipment 214. In one example, when an operator selects a drone (e.g., using a cursor 220), the live feed associated with that drone is displayed. For instance, when an operator selects drone 3 (216), live video feed associated with drone 3 is displayed, depicting a live feed of the current status of equipment 218.

In some examples, the drones move along fixed paths within the process plant. In other examples the drones are fully controlled by operators. In still other examples, the drones generally move along fixed paths within the process plant until an operator takes an action to control a drone's path. In one example, an operator manually controls the physical movements of each drone within the process plant using the drone controls 207. For instance, an operator may use various drone controls 207 to cause the drones to physically move up or down, to rotate, to move forward and backward, etc. Accordingly, the drones can be moved within the process plant to obtain a closer view of various equipment within the plant, enabling an operator to inspect conditions within the plant via the user interface device 8 (i.e., without entering the field environment.)

In another example, an operator controls the physical movements of the drones within the process plant by selecting the depictions 208, 212, 216 of the each drone within the overview 202 of the process plant, or by selecting areas within the overview 202 of the process plant where the drones are to be deployed. In one example, when an operator selects a drone (e.g., using a cursor 220) and clicks and drags it to a new location, the drone is configured to physically travel to the new location. For example, an aerial drone may take off and fly automatically on a predetermined safe route to go a hovering point associated with the selected location. In another example, when an operator selects an area of the process plant overview 202 (and/or a piece of equipment depicted in the process plant overview 202) where no drone is currently located (e.g., using the cursor 220), the drone is configured to physically travel to that area of the process plant. Accordingly, an operator may view a live video feed of the selected area of the process plant once the drone arrives at its destination.

In an example, an operator selects a drone within the overview 202 of the process plant to cause the drone to travel away from its current location to a safe location (which may be selected by the operator or predetermined). For instance, if an individual is trapped in an unsafe location within the process plant, the operator may select a drone near that individual to travel away from its current location to the safe location, and the individual may follow the drone to safety. In another example, an operator selects a drone within the overview 202 of the process plant to cause the drone to travel from an entrance of the process plant to a particular area of the process plant. For instance, if an emergency exists within the plant, emergency personnel may follow the drone from the entrance of the plant to an area of the plant associated with the emergency.

Furthermore, in an example, an operator selects a drone or an area within the overview 202 of the process plant to cause the drone to perform other tasks within the plant. For example, drones may be configured to warn individuals of dangers within the process plant, e.g., by broadcasting a warning or marking a perimeter around an unsafe region. For instance, an operator may select an unsafe region within the overview 202, causing a drone to move to that region and warn individuals of dangers in that region. Moreover, in some instances, an operator may select a drone to transport a medical kit, breathing apparatus, or defibrillator unit to an individual trapped in an unsafe region of the plant. Additionally, an operator may select a drone to activate a switch within the plant (including kill-switches to shut down equipment in unsafe locations, such as drilling sites), take measurements within the plant and/or collect product samples from within the plant.

Figure 4:
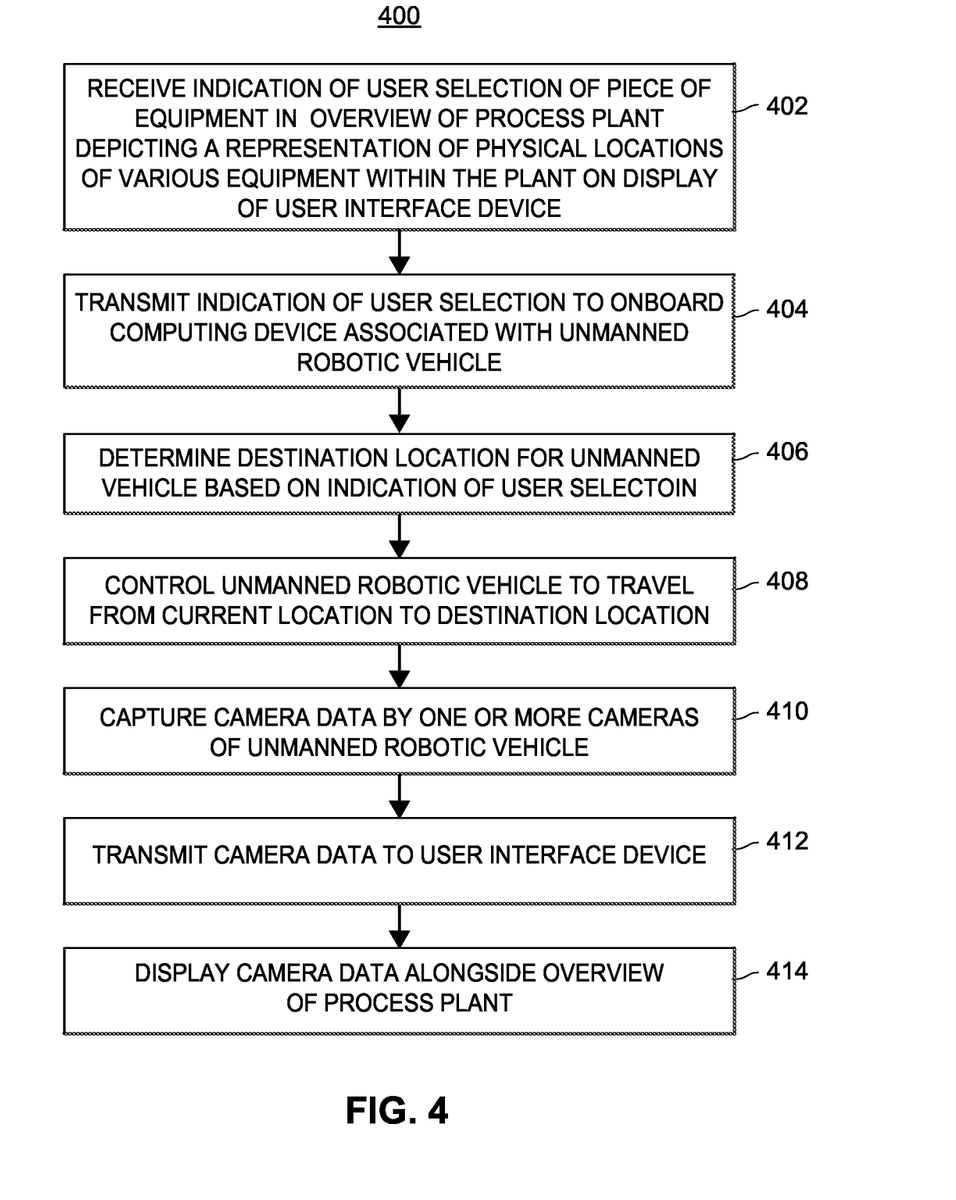
FIG. 4 is a flow diagram of an example method for monitoring process plant conditions using unmanned robotic vehicles.

Referring now to FIG. 4, a flow diagram 400 of an example method for monitoring process plant conditions using unmanned robotic vehicles is illustrated, in accordance with some embodiments. For example, the memory 82 of the onboard computing device 78 of the unmanned robotic vehicle 72 and/or the memory 102 of the user interface device 8 may store instructions, which, when executed by processors 80 or 100, respectively, cause the unmanned robotic vehicle 72 and/or the user interface device 8, respectively, to perform at least a portion of the method 400. The method 400 may include additional, fewer, and/or alternate actions, in embodiments.

At block 402, the user interface device 8 may receive an indication of a user selection of a piece of equipment in an overview of a process plant displayed by the user interface device 8 where an unmanned robotic vehicle 72 is to be deployed. For instance, the overview of the process plant may depict a representation of physical locations of various equipment within the process plant. In some examples, displaying the overview of the process plant may include displaying a representation of a physical location of the unmanned robotic vehicle within the process plant with respect to the equipment in the overview of the process plant.

At block 404, the indication of the user selection may be transmitted to an onboard computing device 78 associated with the unmanned robotic vehicle 72.

At block 406, a destination location for the unmanned robotic vehicle 72 in the process plant may be determined based on the indication of the user selection. In some examples, determining the destination location for the unmanned robotic vehicle in the process plant may include determining a safe hovering point near the physical location of the piece of equipment selected by the user.

At block 408, the unmanned robotic vehicle 72 may be controlled to travel from a current location in the process plant to the destination location in the process plant. For instance, in some examples, controlling the unmanned robotic vehicle 72 to travel from the current location to the destination location may include identifying a safe route from the current location in the process plant to the destination location in the process plant and controlling the unmanned robotic vehicle 72 to travel from the current location in the process plant to the destination location in the process plant via the safe route.

At block 410, camera data may be captured by one or more cameras of the unmanned robotic vehicle 72. In some examples, the camera data may include a live video feed. In some examples, the camera data may include infrared camera data captured by one or more infrared cameras of the unmanned robotic vehicle 72.

At block 412, the camera data may be transmitted to the user interface device 8.

At block 414, the camera data may be displayed alongside the overview of the process plant. In some examples, displaying the camera data alongside the overview of the process plant may include displaying a live video feed based on the camera data alongside the overview of the process plant.

In some examples, the method 400 may further include capturing sensor data by one or more sensors of the unmanned robotic vehicle, the sensor data to the user interface device, and/or displaying the sensor data by the user interface device (not shown in FIG. 4). Capturing sensor data by one or more sensors of the unmanned robotic vehicle may include capturing sensor data from one or more of: location sensors, temperature sensors, flame sensors, gas sensors, wind sensors, accelerometers, and/or motion sensors, of the unmanned robotic vehicle. Additionally, the method 400 may further include analyzing the camera data and/or the sensor data to identify an indication of a condition within the process plant. For instance, the condition may be an overheating condition, a fire condition, a smoke condition, a leak condition, a steam condition, a standing or dripping water condition, a valve condition, a condition of movement within the process plant, etc.

Furthermore, in some examples, the method 400 may further include receiving an indication of a user selection of a switch within the process plant to be activated by the unmanned robotic vehicle, and controlling a robotic arm of the unmanned robotic vehicle to activate the switch within the process plant.

Additionally, in some examples, the method 400 may further include controlling a robotic arm of the unmanned robotic vehicle to collect a sample within the process plant.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 2. The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Moreover, although the foregoing text sets forth a detailed description of numerous different embodiments, the detailed description is to be construed as exemplary only and does not describe every possible embodiment because describing every possible embodiment would be impractical, if not impossible. Numerous alternative embodiments could be implemented, using either current technology or technology developed after the filing date of this patent.

What is claimed is:

1. A method, comprising:
    receiving, by a user interface device, an indication of a user selection of a piece of equipment in an overview of a process plant displayed by the user interface device where an unmanned robotic vehicle is to be deployed, the overview of the process plant depicting a representation of physical locations of various equipment within the process plant;
    transmitting, by the user interface device, the indication of the user selection to an onboard computing device associated with the unmanned robotic vehicle;
    determining, by the onboard computing device associated with the unmanned robotic vehicle, a destination location for the unmanned robotic vehicle in the process plant based on the indication of the user selection;
    controlling, by the onboard computing device associated with the unmanned robotic vehicle, the unmanned robotic vehicle to travel from a current location in the process plant to the destination location in the process plant;
    capturing camera data by one or more cameras of the unmanned robotic vehicle;
    transmitting, by the onboard computing device associated with the unmanned robotic vehicle, the camera data to the user interface device; and
    displaying, by the user interface device, the camera data alongside the overview of the process plant.

2. The method of claim 1, wherein determining the destination location for the unmanned robotic vehicle in the process plant based on the indication of the user selection includes determining a safe hovering point near the physical location of the piece of equipment selected by the user.

3. The method of claim 1, wherein controlling the unmanned robotic vehicle to travel from a current location to the destination location includes:
    identifying, by the onboard computing device associated with the unmanned robotic vehicle, a safe route from the current location in the process plant to the destination location in the process plant; and
    controlling, by the onboard computing device, the unmanned robotic vehicle to travel from the current location in the process plant to the destination location in the process plant via the safe route.

4. The method of claim 1, wherein displaying the camera data alongside the overview of the process plant includes displaying a live video feed based on the camera data alongside the overview of the process plant.

5. The method of claim 1, further comprising:
displaying, by the user interface device, a representation of a physical location of the unmanned robotic vehicle within the process plant with respect to the equipment in the overview of the process plant.

6. The method of claim 1, wherein capturing camera data by one or more cameras of the unmanned robotic vehicle includes capturing infrared camera data by one or more infrared cameras of the unmanned robotic vehicle.

7. The method of claim 1, further comprising:
capturing sensor data by one or more sensors of the unmanned robotic vehicle;
transmitting, by the onboard computing device associated with the unmanned robotic vehicle, the sensor data to the user interface device; and
displaying the sensor data by the user interface device.

8. The method of claim 7, wherein capturing sensor data by one or more sensors of the unmanned robotic vehicle includes capturing sensor data from one or more of: location sensors, temperature sensors, flame sensors, gas sensors, wind sensors, accelerometers, and motion sensors, of the unmanned robotic vehicle.

9. The method of claim 7, further comprising:
analyzing, by the onboard computing device associated with the unmanned robotic vehicle, one or more of the camera data and the sensor data to identify an indication of a condition within the process plant.

10. The method of claim 8, wherein the condition is one or more of an overheating condition, a fire condition, a smoke condition, a leak condition, a steam condition, a standing or dripping water condition, a valve condition, or a condition of movement within the process plant.

11. The method of claim 1, further comprising:
receiving, by a user interface device, an indication of a user selection of a switch within the process plant to be activated by the unmanned robotic vehicle; and
controlling, by the onboard computing device, a robotic arm of the unmanned robotic vehicle to activate the switch within the process plant.

12. The method of claim 1, further comprising:
controlling, by the onboard computing device, a robotic arm of the unmanned robotic vehicle to collect a sample within the process plant.

13. A user interface device configured to communicate with an unmanned robotic vehicle equipped with one or more cameras, the user interface device comprising:
a display;
one or more processors; and
one or more memories storing a set of computer-executable instructions that, when executed by the one or more processors, cause the user interface device to:
receive, from an onboard computing device of the unmanned robotic vehicle, data captured by the one or more cameras of the unmanned robotic vehicle;
display an overview of a process plant alongside the data captured by the one or more cameras of the unmanned robotic vehicle, the overview of the process plant depicting a representation of physical locations of various equipment within the process plant;
receive an operator selection of a piece of equipment within the overview of the process plant where the unmanned robotic vehicle is to be deployed; and
transmit a command to the onboard computing device of the unmanned robotic vehicle indicating the selected piece of equipment within the overview of the process plant where the unmanned robotic vehicle is to be deployed.

14. The user interface device of claim 13, wherein the instructions causing the user interface device to display the data captured by the one or more cameras of the unmanned robotic vehicle include instructions for displaying a live video feed based on the data captured by the one or more cameras.

15. The user interface device of claim 13, wherein the instructions causing the user interface device to display the overview of the process plant include instructions for displaying a representation of a physical location of the unmanned robotic vehicle within the process plant with respect to the equipment in the overview of the process plant.

16. The user interface device of claim 13, wherein the instructions further cause the user interface to display sensor data captured by one or more sensors of the unmanned robotic vehicle.

17. The user interface device of claim 16, wherein the sensor data includes data captured by one or more of location sensors, temperature sensors, flame sensors, gas sensors, wind sensors, accelerometers, or motion sensors, of the unmanned robotic vehicle.

18. The user interface device of claim 13, wherein the instructions further cause the user interface to:
receive an indication of a user selection of a switch within the process plant to be activated by the unmanned robotic vehicle; and
transmit a command to the onboard computing device of the unmanned robotic vehicle indicating the selection of the switch to be activated by the unmanned robotic vehicle.

19. An unmanned robotic vehicle, comprising:
one or more cameras configured to capture images as the unmanned robotic vehicle travels in a process plant,
one or more processors; and
one or more memories storing a set of computer-executable instructions that, when executed by the one or more processors, cause the unmanned robotic vehicle to:
receive commands from a user interface device, wherein commands from the user interface device include commands indicating a piece of equipment in the process plant to which the unmanned robotic vehicle is to be deployed;
determine a destination location in the process plant based on the indication of the piece of equipment in the process plant;
travel from a current location in the process plant to the destination location in the process plant; and
transmit images captured by the one or more cameras to the user interface device.

20. The unmanned robotic vehicle of claim 19, wherein the instructions causing the unmanned robotic vehicle to determine the destination location for the unmanned robotic vehicle in the process plant based on the indication of the piece of equipment in the process plant include instructions causing the unmanned robotic vehicle to determine a safe hovering point near a physical location of the piece of equipment in the process plant.

21. The method of claim 19, wherein the instructions causing the unmanned robotic vehicle to travel from the current location to the destination location include instructions causing the unmanned robotic vehicle to:

identify a safe route from the current location in the process plant to the destination location in the process plant; and travel from the current location in the process plant to the destination location in the process plant via the safe route.

22. The unmanned robotic vehicle of claim 19, wherein the unmanned robotic vehicle is an unmanned aerial vehicle.

23. The unmanned robotic vehicle of claim 19, wherein the one or more cameras include one or more infrared cameras.

24. The unmanned robotic vehicle of claim 19, further comprising:

one or more sensors configured to capture sensor data as the unmanned robotic vehicle travels in the process plant; and wherein the instructions further cause the unmanned robotic vehicle to transmit sensor data captured by the one or more sensors to the user interface device.

25. The unmanned robotic vehicle of claim 24, wherein the one or more sensors include one or more of: location sensors, temperature sensors, flame sensors, gas sensors, wind sensors, accelerometers, and motion sensors.

26. The unmanned robotic vehicle of claim 24, wherein the instructions further cause the unmanned robotic vehicle to:

analyze one or more of the camera data and the sensor data to identify an indication of a condition within the process plant.

27. The unmanned robotic vehicle of claim 26, wherein the condition is one or more of an overheating condition, a fire condition, a smoke condition, a leak condition, a steam condition, a standing or dripping water condition, a valve condition, or a condition of movement within the process plant.

28. The unmanned robotic vehicle of claim 19, further comprising:

a robotic arm configured to one or more of: (i) activate switches within the process plant or (ii) collect samples within the process plant.

29. The unmanned robotic vehicle of claim 19, wherein the instructions further cause the unmanned robotic vehicle to:

receive an indication of a user selection of a switch within the process plant to be activated by the unmanned robotic vehicle; and control the robotic arm of the unmanned robotic vehicle to activate the switch within the process plant.

* * * * *

UNITED STATES PATENT AND TRADEMARK OFFICE
CERTIFICATE OF CORRECTION

| | |
|---|---|
| PATENT NO. | : 11,281,200 B2 |
| APPLICATION NO. | : 16/580793 |
| DATED | : March 22, 2022 |
| INVENTOR(S) | : Robert G. Halgren, III et al. |

It is certified that error appears in the above-identified patent and that said Letters Patent is hereby corrected as shown below:

In the Drawings

At Fig. 4, Sheet 4 of 4, Tag "406", Line 2, "SELECTOIN" should be -- SELECTION --.

In the Specification

At Column 4, Line 40, "FIG. 1; and" should be -- FIG. 1; --.

At Column 4, Line 43, "drones." should be -- drones; and --.

At Column 8, Line 40, "take" should be -- taking --.

At Column 12, Line 38, "backwards," should be -- backward, --.

At Column 15, Line 21, "a" should be -- to a --.

In the Claims

At Column 20, Line 64, "method of claim 19," should be -- unmanned robotic vehicle of claim 19, --.

Signed and Sealed this
Eighteenth Day of November, 2025

John A. Squires
*Director of the United States Patent and Trademark Office*